(12) United States Patent
Yushiya (10) Patent No.: US 7,788,307 B2
(45) Date of Patent: Aug. 31, 2010

(54) METHOD AND APPARATUS FOR GENERATING RANDOM NUMBER

(75) Inventor: Akihiko Yushiya, Nerima-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1029 days.

(21) Appl. No.: 11/279,082

(22) Filed: Apr. 7, 2006

(65) Prior Publication Data

US 2007/0005672 A1 Jan. 4, 2007

(30) Foreign Application Priority Data

Jun. 29, 2005 (JP) ............................. 2005-189942

(51) Int. Cl.
*G06F 1/02* (2006.01)
(52) U.S. Cl. .................................................... 708/250
(58) Field of Classification Search ....................... None
See application file for complete search history.

(56) References Cited

U.S. PATENT DOCUMENTS

| | | | |
|---|---|---|---|
| 5,623,545 A * | 4/1997 | Childs et al. ................... 380/2 |
| 6,792,438 B1 * | 9/2004 | Wells et al. ................. 708/250 |
| 7,266,575 B2 | 9/2007 | Ikeda | |
| 7,269,614 B2 * | 9/2007 | Wells et al. ................. 708/250 |
| 7,546,327 B2 * | 6/2009 | Zheng ........................ 708/250 |
| 2004/0030734 A1 * | 2/2004 | Wells et al. ................. 708/250 |
| 2005/0193045 A1 | 9/2005 | Yamamoto | |

FOREIGN PATENT DOCUMENTS

| JP | 2002-268875 A | 9/2002 |
|---|---|---|
| JP | 2003-029963 A | 1/2003 |
| JP | 2003-131867 A | 5/2003 |

OTHER PUBLICATIONS

"FIPS Pub 140-2", "Information Technology Laboratory, National Institute of Standard" p. 57-58 ,May 25, 2001.

* cited by examiner

*Primary Examiner*—David H Malzahn
(74) *Attorney, Agent, or Firm*—Canon U.S.A., Inc. I.P. Division (57) ABSTRACT

An apparatus for generating a random number includes a holding unit configured to hold a data segment, a mixing unit configured to mix the data segment held in the holding unit, a quality evaluation unit configured to evaluate the quality of the data segment held in the holding unit as a random number, and an output control unit configured to control an output of the data segment based on a result of the quality evaluation performed by the quality evaluation unit.

22 Claims, 10 Drawing Sheets

METHOD AND APPARATUS FOR GENERATING RANDOM NUMBER

BACKGROUND OF THE INVENTION

1. Field of the Invention

The present invention relates to an apparatus for generating a random number and a method for the same.

2. Description of the Related Art

Random numbers are used in various kinds of signal processing in a variety of devices, such as digital imaging devices, game devices, and the like. Recently, as more and more devices have become networked and security functions become incorporated, random numbers have been increasingly used.

For random numbers used when the security functions are incorporated, in particular, it is necessary to have a large number of high-quality random numbers as an important factor for improved security. In this case, unpredictability (the occurrence of any one number in a particular position in a sequence of the random numbers is unpredictable from the occurrence of earlier or later members of the sequence), irregularity in the sequence, sufficiently long periodicity, uniformity (all numbers in the sequence occur equally often in the long run), and the like are more desired.

Japanese Patent Laid-Open No. 2003-029963 discloses a technique in which random numbers generated in a random number generator within an apparatus for generating a random number are output to the outside, the generation of random numbers is concurrently tested by a testing circuit within the apparatus, and, following the completion of the output of random numbers, the test result is output after the test is complete.

In this technique, however, it is not determined whether the quality of random numbers output from the apparatus for generating random numbers to the outside is sufficient until the test performed by the testing circuit is completed. In other words, random numbers whose quality has not been assured may be output.

In a case where an application that uses random numbers needs high-quality random numbers, for example, it is necessary to buffer a predetermined amount of random numbers outside the apparatus, check the result of the test performed by the testing circuit inside the apparatus, and then determine whether the buffered random numbers are to be used.

SUMMARY OF THE INVENTION

The present invention provides a random-number generating apparatus that can reliably generate a random number whose quality is sufficient and a method for the same.

According to an aspect of the present invention, an apparatus for generating a random number includes a holding unit configured to hold a data segment, a quality evaluation unit configured to perform a quality evaluation of the data segment held in the holding unit as a random number, a mixing unit configured to mix the evaluated data segment based on a result of a quality evaluation performed by the quality evaluation unit, and an output control unit configured to control an output of the evaluated data segment based on the result of the quality evaluation performed by the quality evaluation unit.

According to another aspect of the present invention, a method for generating a random number includes performing a quality evaluation of a data segment held in a predetermined holding unit as a random number; mixing the evaluated data segment based a result of the quality evaluation; and controlling an output of the evaluated data segment.

Further features of the present invention will become apparent from the following description of exemplary embodiments with reference to the attached drawings.

DESCRIPTION OF THE EMBODIMENTS

Exemplary embodiments are described below with reference to the attached drawings.

First Exemplary Embodiment

Figure 1:
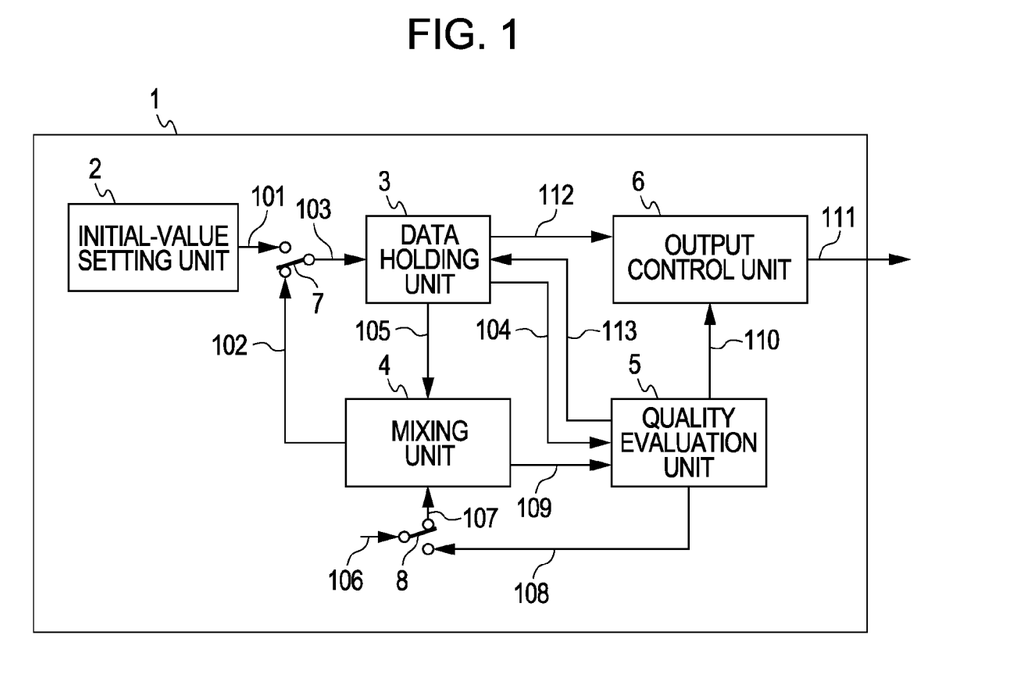
FIG. 1 is a functional block diagram of a random-number generating apparatus according to a first exemplary embodiment of the present invention.

FIG. 1 shows a block diagram of a random-number generating apparatus to which an exemplary embodiment of the present invention is applied. A random-number generating apparatus 1 is configured to output one or more random numbers with assured quality. An initial-value setting unit 2 is configured to set an initial value of data in a data holding unit 3. The data holding unit 3 is configured to hold the data. A mixing unit 4 is configured to extract and mix a data segment. A quality evaluation unit 5 is configured to evaluate the quality of a data segment from the data holding unit 3. An output control unit 6 is configured to control the output of a data segment from the data holding unit 3 on the basis of a result of the quality evaluation performed by the quality evaluation unit 5.

An initial-data segment 101 is a data segment that indicates the initial value output from the initial-value setting unit 2. A mix data segment 102 is a data segment that has been mixed by the mixing unit 4. A data segment 103 is either the initial data segment 101 or the mixed data segment 102 and is a data segment to be input to the data holding unit 3. Data segments 104, 105, and 112 are data segments that have been extracted from the data holding unit 3. A first parameter 106 is a parameter that indicates a set value of the mixing number. A second parameter 108 is a parameter that indicates the number of further mixes determined by the quality evaluation unit 5. A selected parameter 107 is either the first parameter 106 or the second parameter 108 and is a parameter that indicates the mixing number selected. A completion signal 109 is a signal that indicates the completion of the mixing number. Output control signals 110 and 113 are signals for controlling the output of random numbers determined by the quality evaluation unit 5. A random-number data segment 111 is a data segment of random numbers with assured quality.

A data switch 7 is a switch that chooses between the initial data segment 101 and the mixed data segment 102. A parameter switch 8 is a switch that chooses between the first parameter 106 and the second parameter 108.

With reference to FIG. 1, an exemplary action of generating random numbers in the random-number generating apparatus according to the first exemplary embodiment is described below.

First, the initial-data segment 101 is output from the initial-value setting unit 2. Although there are various methods for generating the initial-data segment 101, the initial-data segment 101 is generated by a pseudorandom number generator in this exemplary embodiment. The method for generating the initial value data is not limited to this. The initial-data segment 101 may be generated by, for example, a physical random number generator.

At this stage, no data mixing has been made. Therefore, for the first-time around, the initial-data segment 101 is chosen between the initial-data segment 101 and the mixed data segment 102. The selected initial-data segment 101 is temporarily held in the data holding unit 3 as the data segment 103.

Then, the data segment 105, which has been extracted from the data holding unit 3, is mixed in the mixing unit 4. The mixing unit 4 mixes the data segment 105 in units of necessary bits by using a hash function, block encryption, or the like. Such a mixing using the hash function, the block encryption, or the like, increases irregularity of the bits in the data segment 105, so that a high-entropy data sequence is realized.

Here, mixing represents processing that increases the irregularity of a bit string in a data segment to be mixed and that improves the quality as random numbers. Mixing is not limited to processing using the hash function, block encryption, or the like, as described above, and is any processing as long as such properties are satisfied.

The mixing unit 4 first outputs the data segment 105 as the mixed data segment 102. The mixed data segment 102 is then selected as the data segment 103, which is to be written in the data holding unit 3, by the data switch 7. In this way, a predetermined amount of data is read from the data holding unit 3, the read data is mixed in the mixing unit 4, and the data is written in the data holding unit 3 again.

The writing of data to the data holding unit 3 is performed in the same order as that in the reading of data from the data holding unit 3.

The mixing unit 4 receives the selected parameter 107, which is chosen between the first parameter 106, which indicates a predetermined value of the mixing number, and the second parameter 108, which is output from the quality evaluation unit 5 and indicates the mixing number. For the first-time around, the first parameter 106 is selected as the selected parameter 107. The mixing unit 4 mixes the data segment an indicated number of times that is indicated by the first parameter 106.

For the mixing number, one count is represented by a process in which a data segment is extracted from the data holding unit 3, the data segment is mixed in the mixing unit 4 in accordance with the hash function, block encryption, and the like, and, after the completion of the mixes, the mixed data segment 102 is written in the data holding unit 3.

In this way, when mixing the data segment a predetermined number of times is complete, the mixing unit 4 then outputs the completion signal 109.

The quality evaluation unit 5 performs a quality evaluation of random numbers by processing the mixed random-number data segment 104 in units of predetermined amounts.

There are various kinds of quality evaluation performed by the quality evaluation unit 5. Here, as a representative example, a random number test known as Federal Information Processing Standards Publication (FIPS PUB) 140-2 is performed.

The details (tests 1 to 4) of the quality evaluation (test) for randomness are described below.

1. Monobit Test $$9,725 < X < 10,275 \quad (1)$$

where X is the number of ones in a bit stream of 20,000 consecutive random bits.

2. Run Test $$X < 26 \quad (2)$$

where X is the maximal number of consecutive bits of all ones or all zeros in the 20,000 bit stream.

3. Runs Test $$2,315 < X1 < 2,685 \quad (3)$$

$$1,114 < X2 < 1,386 \quad (4)$$

$$527 < X3 < 723 \quad (5)$$

$$240 < X4 < 384 \quad (6)$$

$$103 < X5 < 209 \quad (7)$$

$$103 < X6 < 209 \quad (8)$$

where i is the number of consecutive bits of all zeros or all ones in the 20,000 bit stream and Xi is the incidence thereof.

4. Poker Test $$2.16 < X < 46.17 \quad (9)$$

where $X=(16/5000)*(\Sigma i[f(i)]^2)-5000$, and, when the 20,000 bit stream is divided into 5,000 consecutive 4 bit segments and the number of occurrences of the 16 possible 4 bit values is counted, f(i) denotes the number of each 4 bit value i ($0 \leq i \leq 15$).

The quality evaluation unit 5 performs the random number test described above. If the data segment passes all tests 1 to 4 in the test, the quality evaluation unit 5 permits the output of the random-number data segment by using the output control signals 110 and 113.

After receiving the permission of the output, the output control unit 6 reads only a desired amount of the mixed data segment 112 and outputs the read data segment as the random-number data segment 111 to the outside.

The output control unit 6 can perform not only simple reading of a block of mixed data but also reading in another manner.

In particular, after the reception of the permission of the output, the output control unit 6 can randomly read data elements in the mixed data segment 112 and combine the read data elements, and then output the combined data segment as the random-number data segment 111. This results in increased irregularities of bits, so that a high-entropy data string is achieved.

Figure 4:
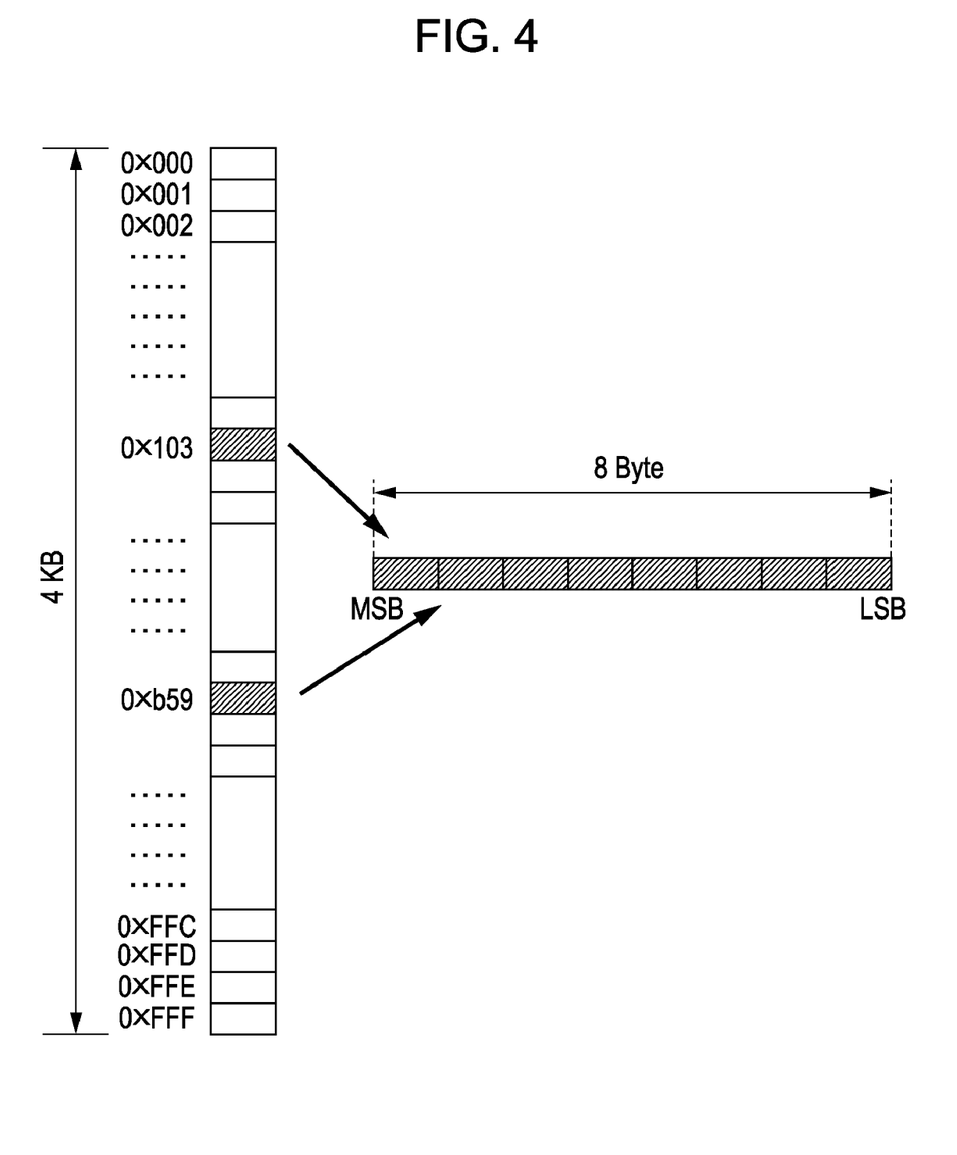
FIG. 4 shows how data is read from a data holding unit according to an exemplary embodiment.

FIG. 4 shows such a reading action from the data holding unit 3. In this case, the data holding unit 3 is designed to handle 4 KB data and be capable of reading and writing data in one byte.

In a case where eight bytes of data are read from the data holding unit 3, for example, one byte of data at an address 0x103 is first read from the data holding unit 3, and then one byte of data at an address 0xb59 is read in a similar manner. At this time, each address having 12 bits is randomly selected when the data is read from the data holding unit 3 in such a way that each address is read once and all addresses are read without reading one address twice. Such a random addressing is realized by, for example, generation of random numbers performed by a well-known maximum-length linearly recurring sequence (m-sequence) random number generator. Although M-sequence random numbers cannot use data at 0x000 and are of low quality as a random number, the capabilities of this generation are adequate as long as each 12-bit address is read only once and all addresses are read.

The output control unit 6 may output the combined random-number data segment to the quality evaluation unit 5 before testing. In this case, the probability of passing the test is increased.

The quality evaluation unit 5 permits the output of a random-number data segment by using the output control signal 110 only when the random-number data segment passes all tests 1 to 4. If a test that has failed is present, the data segment 105 is subsequently mixed to improve the quality of random numbers.

Figure 3:
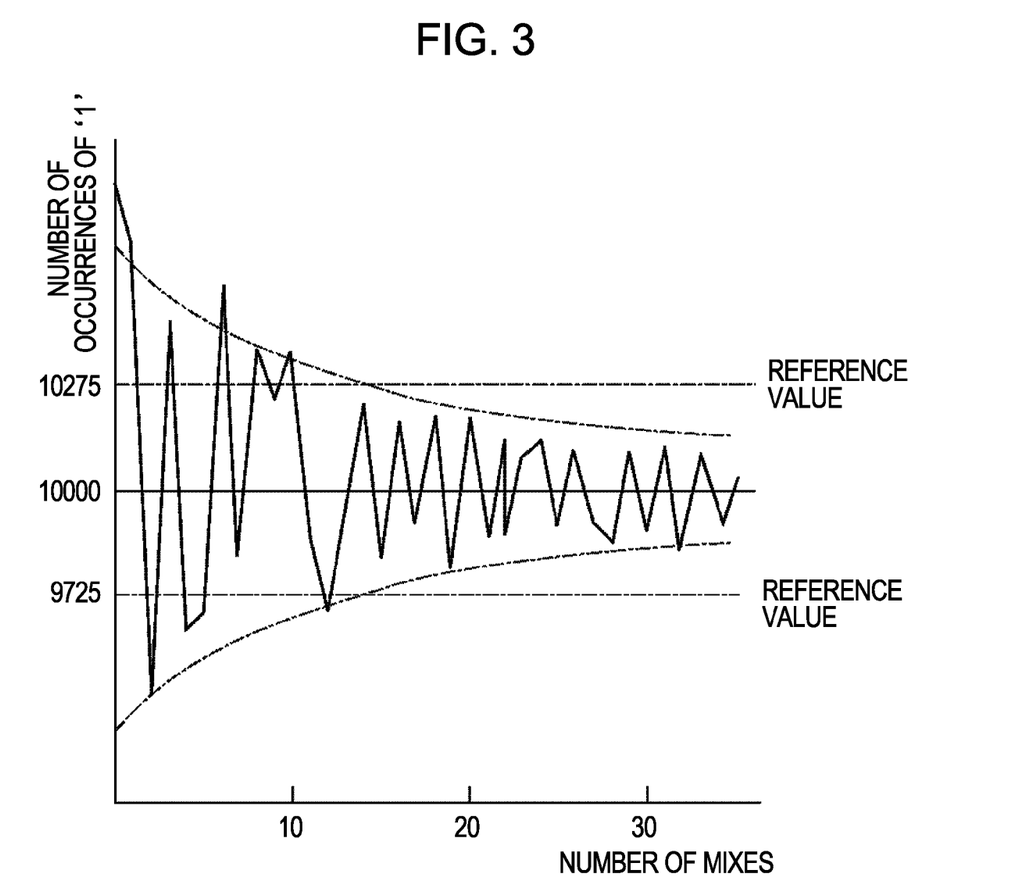
FIG. 3 shows the progression of evaluated values for an exemplary test with respect to values of the mixing number of random numbers according to an exemplary embodiment.

The relationship between the mixing number and the quality of random numbers is illustrated in FIG. 3 with respect to test 1 as an example. As the mixing number is increased, the number X of occurrences of ones in the data segment 104 is changed as indicated by solid lines. Although the values of the number X are uneven, 90% or more of the values lies within a range indicated by dotted lines. Therefore, it is necessary to perform mixes about 15 times in succession to satisfy expression 1. Accordingly, when the first parameter 106, which is to be set in the mixing unit 4, is set at 15, the data segment passes test 1 with a probability of 90% or more.

The first parameter 106, which is to be set in the mixing unit 4, may be set at the mixing number that allows the random-number data segment to pass the test with a probability of about 100%.

If a result of the quality evaluation does not reach the quality standard in the quality evaluation unit 5, the second parameter 108 for further mixes is set on the basis of the value of the number X in the tests.

One exemplary setting method is to set the difference between the mixing number that will allow the random-number data to pass test 1 with a probability of about 100% and the mixing number that has not allowed the random-number data to satisfy the quality standard in the quality evaluation unit 5. The mixing unit 4 repeatedly mixes the data segment only the differential number of times. After a sufficient quality of random numbers is achieved, the random-number data segment 111 is output from the output control unit 6.

Setting the parameter in this way allows the data segment to pass the test with reliability after two quality evaluations.

Figure 2:
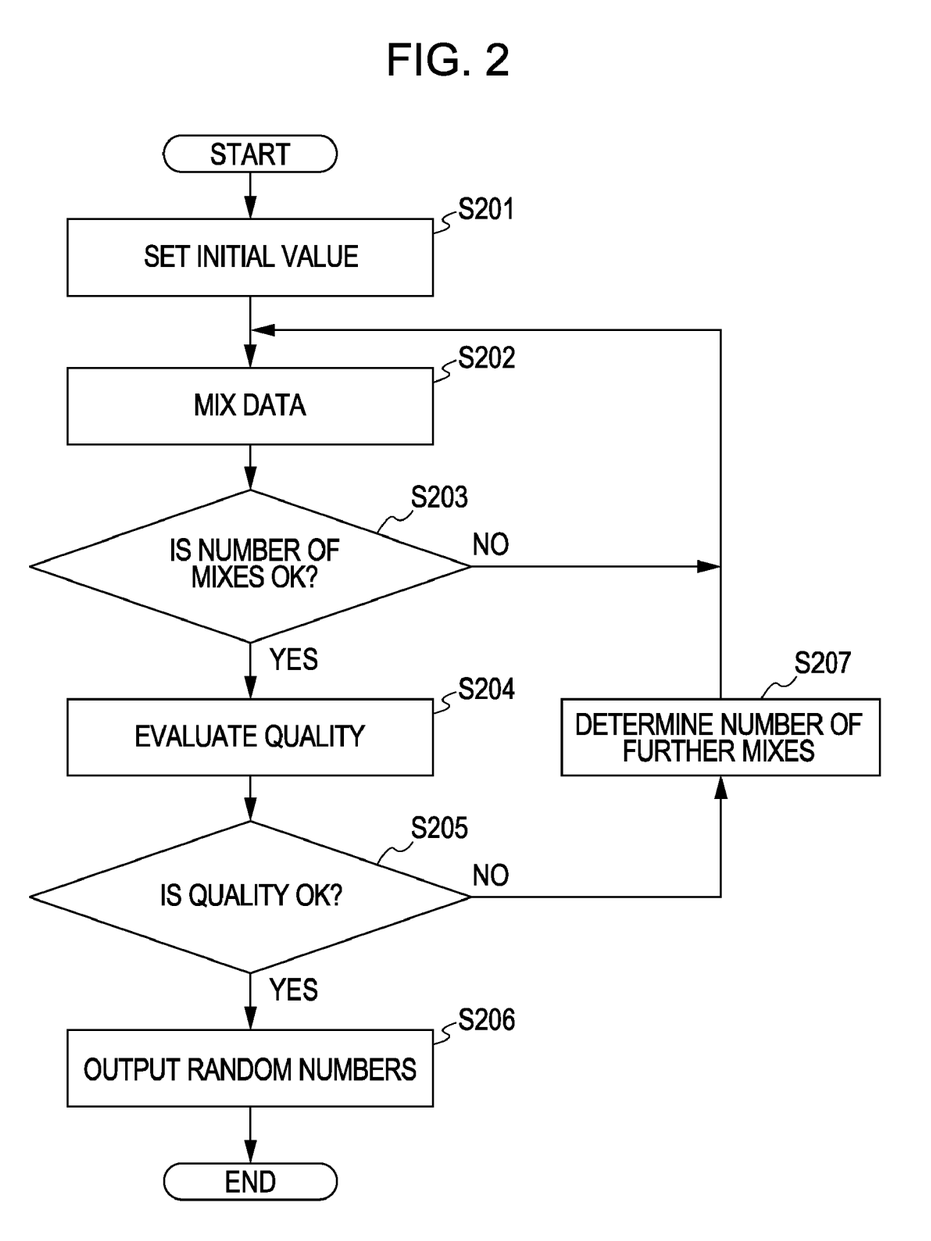
FIG. 2 is a flowchart of an algorithm for random number generation according to the first exemplary embodiment.

FIG. 2 is a flowchart of an exemplary process of random number generation in the random-number generating apparatus to which the first exemplary embodiment of the present invention is applied. With reference to this flowchart, a process flow of the random number generation in the random-number generating apparatus according to the first exemplary embodiment of the present invention is described below.

In step S201, the initial-value setting unit 2 sets an initial value for data which is to be held in the data holding unit 3.

In step S202, the mixing unit 4 mixes a data segment received from the data holding unit 3.

In step S203, the mixing unit 4 counts the number of mixes have been performed. If the counted number does not reach a set value of the mixing number, the processing returns to step S202 which remixes the data segment. If the counted number reaches the set value of the mixing number, the processing proceeds to step S204, which is described below.

In step S204, the quality evaluation unit 5 evaluates the quality of the mixed data segment.

If, in step S205, it is determined that a result of the quality evaluation does not reach the quality standard, processing moves to step S207 to determined a number of further mixes. Processing then returns to step S203 and the mixing unit 4 continues data mixing. On the other hand, if, in step S205, it is determined that the result reaches the quality standard, the processing proceeds to step S206, which is described below.

In step S206, the output control unit 6 outputs the random-number data segment in which the result of the quality evaluation reaches the quality standard in step S205 and processing ends.

In step S207, the quality evaluation unit 5 calculates the number of additional mixes required for passing the test to determine a value of the number of further mixes. Processing then returns to step S202.

In this exemplary embodiment, after the initial value is set, the mixing unit 4 performs mixing. However, before mixing, the quality of the initial value data may be evaluated in the quality evaluation unit 5.

Since the quality evaluations in the quality evaluation unit 5 must handle a great quantity of random numbers, it requires much time to process the quality evaluations. Therefore, in a case where the quality evaluation unit 5 deals with a plurality of quality evaluations of random numbers which are known as FIPS PUB 140-2, the quality evaluation unit 5 may perform only a test in which the previous evaluation failed.

As described above, the quality evaluation of data held in the data holding unit is performed, and the output of random numbers is permitted only when the data reaches a predetermined standard. Therefore, random numbers whose quality is assured can be output with reliability.

Second Exemplary Embodiment

In the second exemplary embodiment, the quality evaluation unit 5 determines the mixing number required for sufficient quality on the basis of a predetermined probability, thus optimizing overhead in data mixing and quality evaluation.

First, data mixing is described below. The time required for data mixing depends on various factors, such as the size of the data holding unit 3, a function used for mixing, and the like. Therefore, the fewest number of mixes is better as long as a desired quality of random numbers is achieved.

By taking test 1 as an example, expression 1 can be transformed as follows:

$$X' < 275 \tag{10}$$

where $X' = |X - 10000|$

Figure 5:
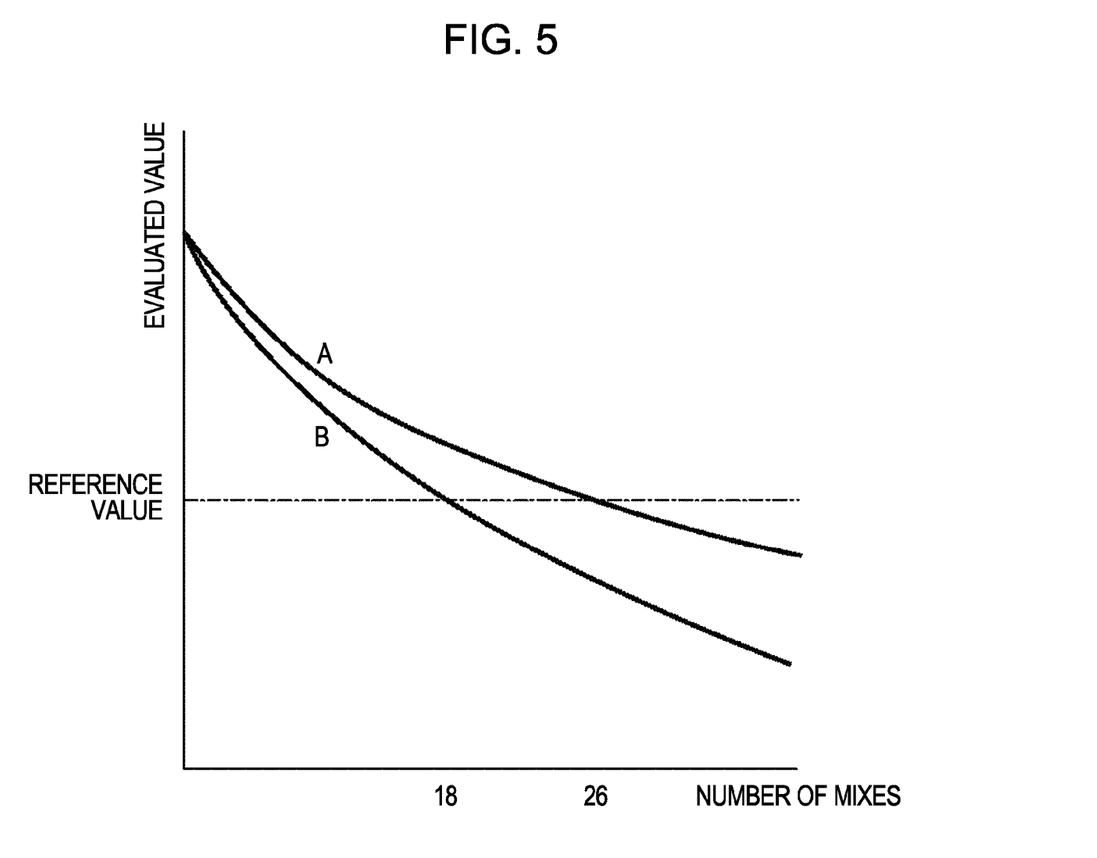
FIG. 5 shows variations in the progression of random number evaluated values with respect to values the mixing number of data according to an exemplary embodiment.

FIG. 5 shows the progression of values of the number X' with respect to values of the mixing number. Referring to FIG. 5, the quality of random numbers is generally improved in a simple manner with an increase in the mixing number.

However, the degrees of improvements in the quality of random numbers are varied, depending on a method for setting the initial value or an algorithm of a hash function. As shown in FIG. 5, when the number XT with respect to the mixing number descends in curves A and B that have a gap therebetween, the mixing number required for reaching a reference value is 26 at curve A and is 18 at curve B, i.e., the difference in the degree between them is 8.

The quality evaluation unit 5 holds a record of the numbers of mixes that have been performed and calculates the mixing number required for satisfying the standard with respect to each test by probability on the basis of the record. The quality evaluation unit 5 outputs a value of the mixing number that allows the data segment to pass the test with a desired probability. For example, the quality evaluation unit 5 first sets as the first parameter 106 the mixing number that allows the data segment to pass the test with a probability of 60%. After data mixing is performed a predetermined number of times, if the quality evaluation unit 5 determines that the mixed data segment does not reach the quality standard, the quality evaluation unit 5 then sets as the second parameter 108 the mixing number that will allow the data to pass the test with a probability of about 100%. Therefore, the mixing number can be optimized.

Figure 6:
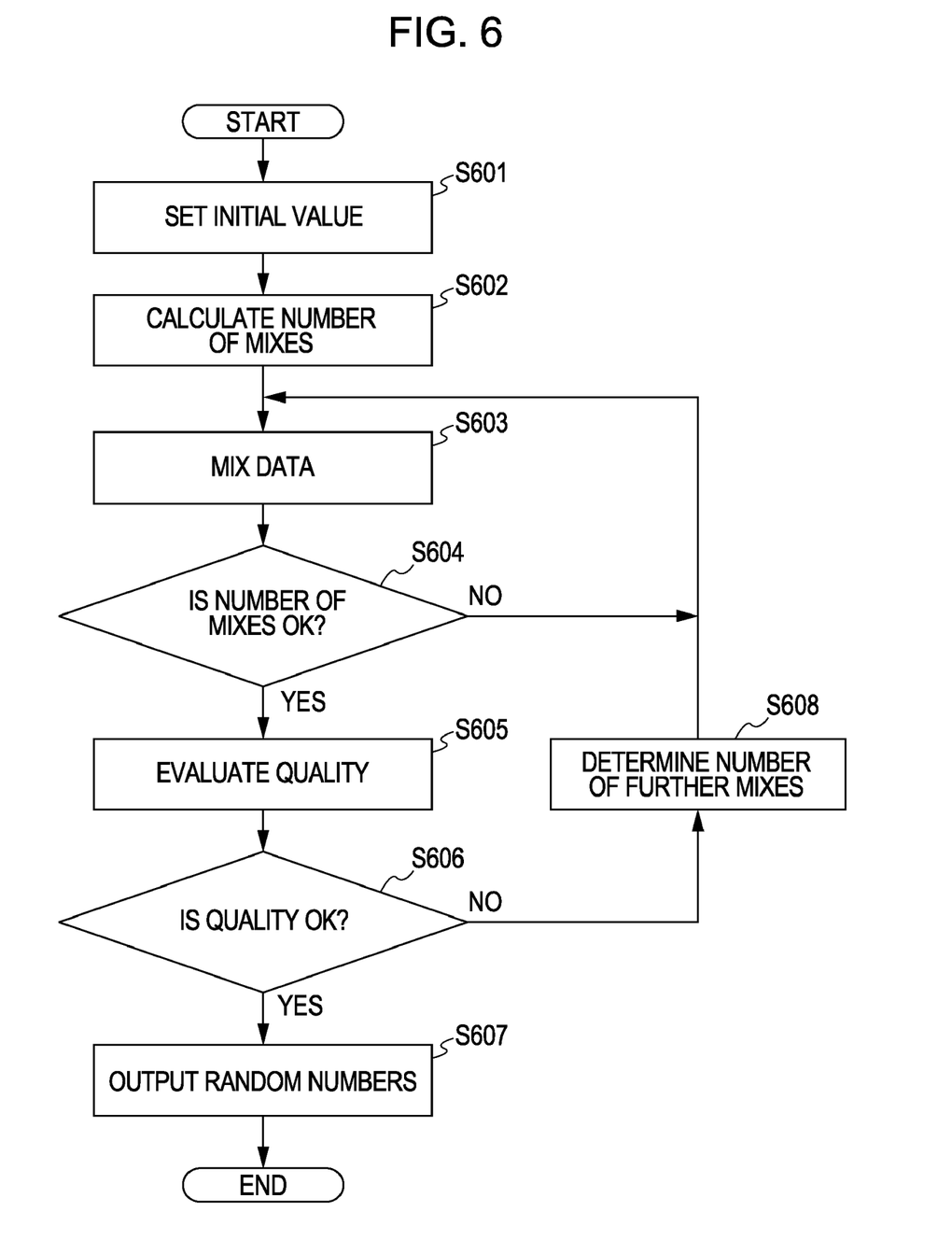
FIG. 6 is a flowchart of an algorithm for random number generation according to a second exemplary embodiment of the present invention.

FIG. 6 is a flowchart of random-number generation according to the second exemplary embodiment.

With reference to this flowchart, a process flow of the random-number generation in the random-number generating apparatus according to the second exemplary embodiment is described below.

In step S601, the initial-value setting unit 2 sets an initial value for data which is to be held in the data holding unit 3.

In step S602, the quality evaluation unit 5 calculates the mixing number that allows a data segment to pass quality evaluation by probability on the basis of the initial value data and an algorithm of a hash function or block encryption used for mixing.

In step S603, the mixing unit 4 mixes the data segment a calculated number of times calculated by probability.

In step S604, the mixing unit 4 counts the number of mixes that have been performed. If the counted number does not reach the set value of the mixing number set in the quality evaluation unit 5, the processing returns to step S603 which remixes the data segment. If the counted number reaches the set value of the mixing number, the processing proceeds to step S605, which is described below.

In step S605, the quality evaluation unit 5 evaluates the quality of the mixed data segment.

If, in step S606, it is determined that a result of the quality evaluation does not reach the quality standard, processing moves to step S608 to determine a number of further mixes. Processing then returns to step S603 and the mixing unit 4 continues data mixing. On the other hand, if, in step S606, it is determined that the result reaches the quality standard, the processing proceeds to step S607, which is described below.

In step S607, the output control unit 6 outputs the random-number data segment in which the result of the quality evaluation reaches the quality standard in step S606.

If, in step S608, the result of the quality evaluation does not reach the quality standard, the quality evaluation unit 5 calculates the number of additional mixes required for passing the test to determine the number of further mixes in step S608 and processing then returns to step S603.

If a plurality of functions used for data mixing, such as a hash function, block encryption, and the like, is present, a function is randomly selected every time a mix is performed to enhance tamper resistance of random numbers under normal conditions. In a case where the data segment is required to be mixed urgently, the hash function may be selected for mixing with a short processing time. Therefore, overhead in data mixing can be adapted to various conditions.

The output control unit 6 may extract predetermined-bit data elements from the data holding unit 3 and output to the quality evaluation unit 5 the data segment 112 in which the extracted data elements are combined. As in the case of the first exemplary embodiment, in a case where a plurality of quality evaluations for random numbers which are known as FIPS PUB 140-2 is performed in the quality evaluation unit 5, the quality evaluation unit 5 performs only a test in which the previous evaluation failed.

As described above, the quality evaluation unit 5 can optimize means for data mixing, the mixing number, the frequency of quality evaluations, tests on the basis of a predetermined parameter, automatic determination of urgency in data mixing. This contributes to a reduction in overhead in performance in a system for data mixing.

Third Exemplary Embodiment

In the third exemplary embodiment, an action control after the output of a random-number data segment to the outside of the random-number generating apparatus starts is described. In this exemplary embodiment, when or immediately after the output of the random-number data segment to the outside of the random-number generating apparatus starts, the initial-value setting unit writes a fixed value in at least one part of the data holding unit. The quality of random numbers of a data segment extracted from the data holding unit is reduced intentionally, thus making it obligatory for the data segment held in the data holding unit to be mixed.

Figure 7:
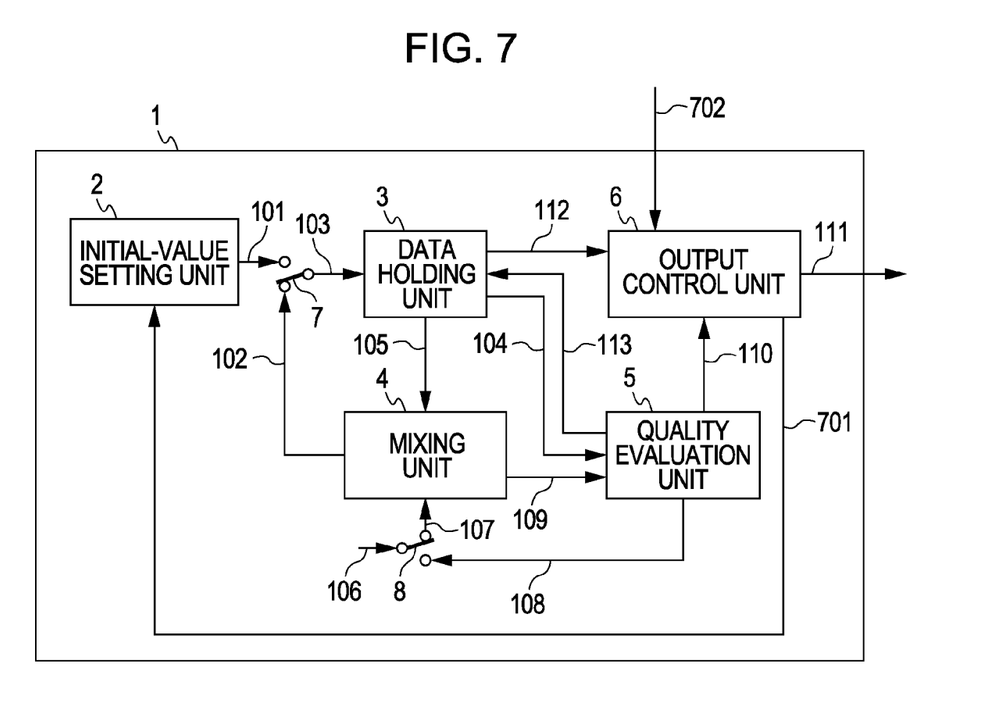
FIG. 7 is a functional block diagram of a random-number generating apparatus according to a third exemplary embodiment of the present invention.

FIG. 7 is a block diagram of the random-number generating apparatus to which this exemplary embodiment of the present invention is applied. In FIG. 7, the same reference numerals are used as in the first exemplary embodiment for similar components, and the explanation thereof is not repeated here. An initial-value selection signal 701 is a signal for selecting the fixed value or a variable value as the initial value in the initial-value setting unit 2. A random-number output reading signal 702 is sent from outside the random-number generating apparatus.

With reference to FIG. 7, an exemplary action of the random number generation in the random-number generating apparatus according to this exemplary embodiment is described below. In this exemplary embodiment, a process up to the attainment of the sufficient quality of random numbers performed by the mixing unit 4 is the same as that in the first exemplary embodiment and is not repeated here.

In this exemplary embodiment, after the sufficient quality of random numbers is achieved in the quality evaluation unit 5, the output control unit 6 starts the output of the random-number data segment 111 in response to the random-number output reading signal 702 sent from the outside. After starting the output of the random-number data segment 111, the output control unit 6 outputs the initial-value selection signal 701 to the initial-value setting unit 2 until a predetermined fixed amount of random numbers is output. In response to the initial-value selection signal 701, the initial-value setting unit 2 changes the initial value from the variable value generated in a pseudorandom number generator to the fixed value and outputs the initial-data segment 101 indicating the initial value.

After the output of random numbers starts, the data switch 7 selects the initial-data segment 101 output from the initial-value setting unit 2 as the data segment 103, which is to be written in the data holding unit 3. In this way, after the output of the random-number data segment 111 starts, the fixed value is continuously written in the data holding unit 3. The action of writing the fixed value in response to the initial-value selection signal 701 continues until the random-number data segment 111 output from the output control unit 6 exceeds the predetermined amount.

If the random-number data segment 111 output from the output control unit 6 exceeds the predetermined amount, the quality evaluation unit 5 evaluates the quality of the data segment 104 held in the data holding unit 3 again. Since the fixed value is written in the data holding unit 3 after the output of the random-number data segment 111 to the outside starts, the quality of the data segment 104 extracted from the data holding unit 3 is reduced. If the quality does not reach the standard for quality evaluation, the mixing number is set by using the second parameter 108, which indicates the number of further mixes. The mixing unit 4 mixes the data segment a set number of times. Then, the quality evaluation unit 5 evaluates the quality of the data segment 104 mixed by the mixing unit 4 again.

In this way, the sufficient quality of the random-number data is assured again, and the random-number data becomes capable of being output.

Figure 8:
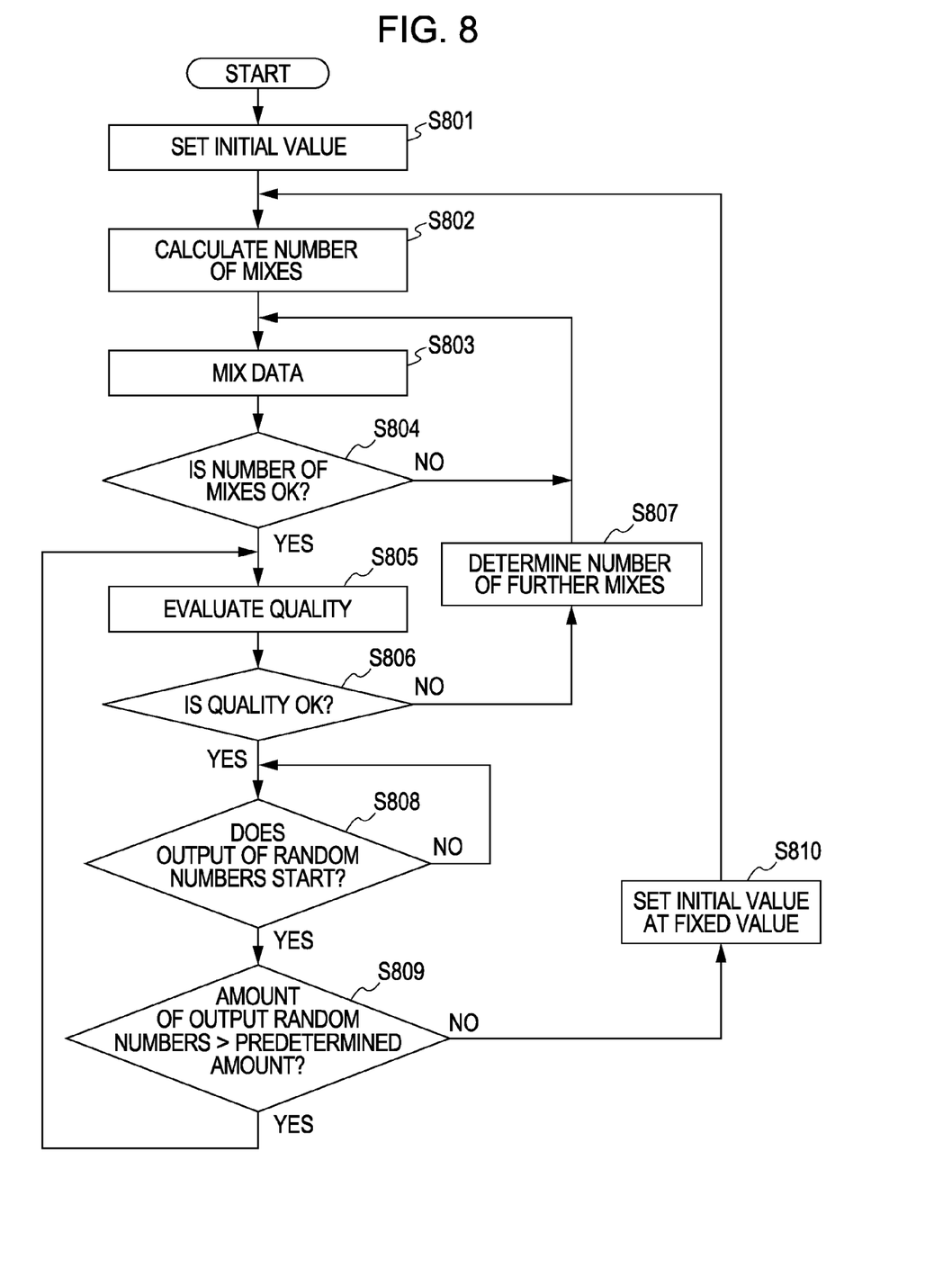
FIG. 8 is a flowchart of an algorithm for random number generation according to the third exemplary embodiment.

FIG. 8 is a flowchart of random-number generation in the random-number generating apparatus to which the third exemplary embodiment is applied. With reference to this flowchart, a process flow of the random-number generation in the random-number generating apparatus according to the third exemplary embodiment is described below.

In step S801, the initial-value setting unit 2 sets an initial value for data which is to be held in the data holding unit 3.

In step S802, the quality evaluation unit 5 calculates the mixing number that allows a data segment to pass quality evaluation by probability on the basis of the initial value data and an algorithm of a hash function or block encryption used for mixing.

In step S803, the mixing unit 4 mixes the data segment a calculated number of times calculated by probability.

In step S804, the mixing unit 4 counts the number of mixes that have been performed. If the counted number does not reach the set value of the mixing number set in the quality evaluation unit 5, the processing returns to step S803 which remixes the data segment again. If the counted number reaches the set value of the mixing number, the processing proceeds to step S805, which is described below.

In step S805, the quality evaluation unit 5 evaluates the quality of the mixed data segment.

If, in step S806, it is determined that a result of the quality evaluation does not reach the quality standard, the mixing unit 4 continues data mixing. On the other hand, if, in step S806, it is determined that the result reaches the quality standard, the processing proceeds to step S808, which is described below.

If, in step S806, it is determined that the result of the quality evaluation does not reach the standard for quality evaluation, the quality evaluation unit 5 calculates the number of additional mixes required for passing the test to determine the number of further mixes in step S807. Processing then returns to step S803 and the mixing unit 4 continues data mixing.

If, in step S806, it is determined that the result of the quality evaluation reaches the standard for quality evaluation, the output control unit 6 waits until the output of the random-number data starts in response to a request from the outside in step S808.

In step S809, immediately after the output of the random-number data starts, the output control unit 6 determines whether a predetermined amount of random-number data has been output.

If it is determined in step S809 that the amount of the random-number data segment output from the output control unit 6 does not exceed the predetermined amount, processing moves to step S810 and the initial-value setting unit 2 sets the initial value for data mixing at the fixed value and writes the fixed value in the data holding unit 3. Processing then returns to step S802. On the other hand, if it is determined in step S809 that the amount of the random-number data output exceeds the predetermined amount, the processing returns to step S805.

As described above, after the output of the random-number data segment to the outside of the random-number generating apparatus starts, the fixed value is written in the data holding unit 3 so that the quality of the data segment extracted from the data holding unit 3 is intentionally reduced. Therefore, the data segment held in the data holding unit 3 can be remixed, so that the random-number data segment that is of high quality and high tamper resistance can be output at all times.

Fourth Exemplary Embodiment

Figure 9:
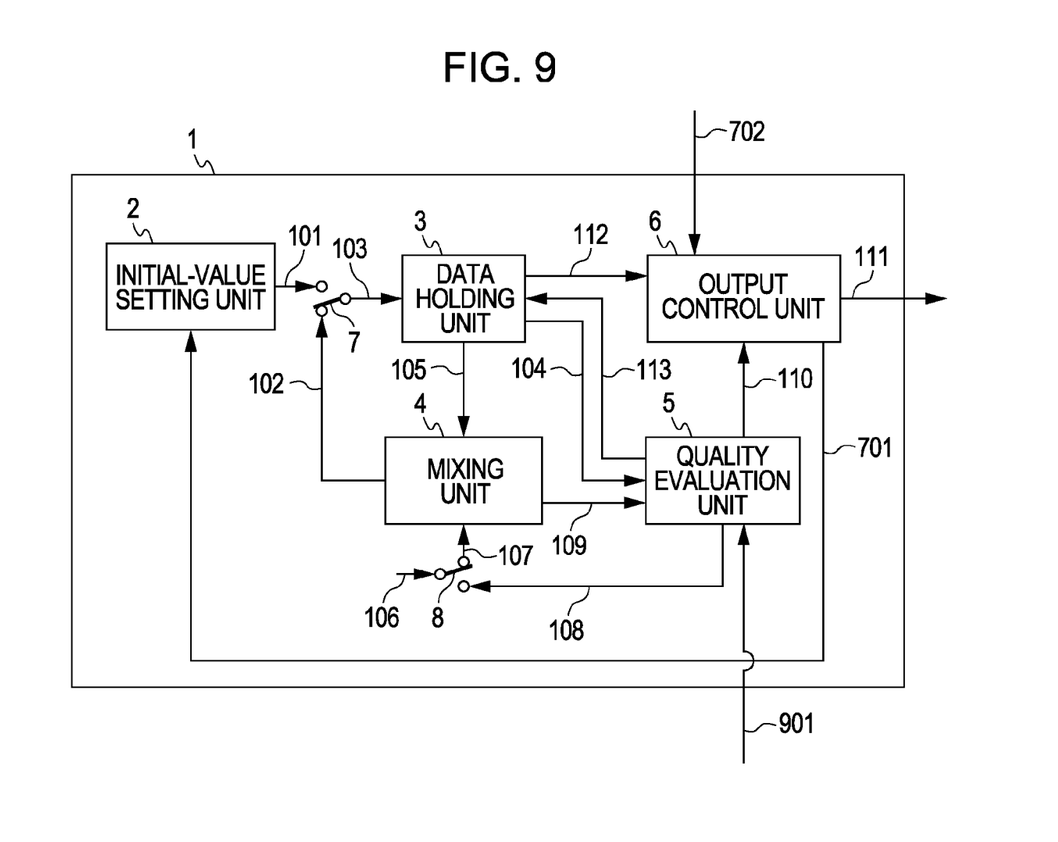
FIG. 9 is a functional block diagram of a random-number generating apparatus according to a fourth exemplary embodiment of the present invention.

FIG. 9 is a block diagram of the random-number generating apparatus according to the fourth exemplary embodiment of the present invention. In FIG. 9, the same reference numerals are used as in the third exemplary embodiment for similar components, and the explanation thereof is not repeated here. Whereas the initial value for data mixing is set at a fixed value until the predetermined amount of data is output in the third exemplary embodiment, the initial value is set at the fixed value until a request for quality evaluation is received from outside the apparatus in the fourth exemplary embodiment.

A quality-evaluation request signal 901 is a signal that requests quality evaluation and that is input from outside the random-number generating apparatus 1. The quality-evaluation request signal 901 is input to the quality evaluation unit 5.

With reference to FIG. 9, an exemplary action of the random number generation in the random-number generating apparatus according to the fourth exemplary embodiment is described below. The actions similar to those in the third exemplary embodiment are not described here.

After the output control unit 6 starts the output of the random-number data segment 111, if a request for quality evaluation is accepted by receiving the quality-evaluation request signal 901 input from outside the random-number generating apparatus 1, the output control unit 6 performs quality evaluation. Until the request for quality evaluation is accepted, as in the third exemplary embodiment, the initial-value setting unit 2 sets the initial value at the fixed value and outputs the fixed value as the initial-data segment 101.

As is the case of the first exemplary embodiment, the second parameter 108, which indicates the number of further mixes, is generated on the basis of a result of quality evaluation performed by the quality evaluation unit 5, and the mixing unit 4 performs data mixing a predetermined number of times. The quality evaluation unit 5 evaluates the quality of data, and the data is mixed until the sufficient quality is achieved.

In this way, the sufficient quality of the random-number data is assured again, and the random-number data becomes capable of being output.

Figure 10:
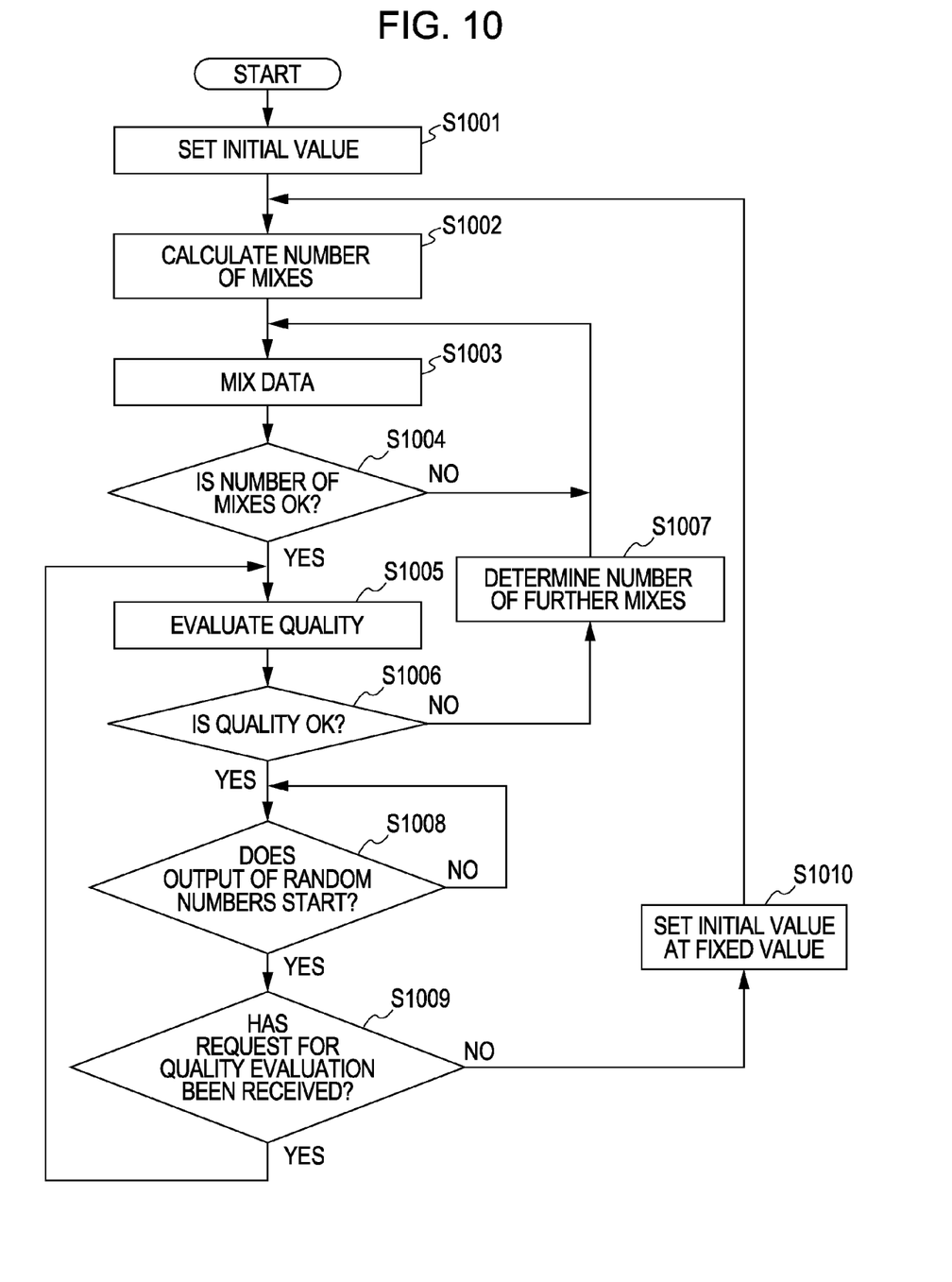
FIG. 10 is a flowchart of an algorithm for generating a random number according to the fourth exemplary embodiment.

FIG. 10 is a flowchart of random-number generation in the random-number generating apparatus according to the fourth exemplary embodiment. In FIG. 10, the steps except S1009 are the same as the corresponding steps in the third exemplary embodiment (FIG. 8), and the explanation thereof is not repeated here.

In step S1009, immediately after the output of random numbers starts, it is determined whether a request for quality evaluation has been received from the outside. Immediately after the output of random numbers starts, the initial value for data mixing is set at the fixed value and the fixed value is continuously written in the data holding unit 3 until the request for quality evaluation is received. When the request for quality evaluation is received, the processing then proceeds back to step S1005 which performs the quality evaluation again. If it is determined in step S1006 the quality is reduced to below the standard, the number of further mixes is determined in step S1007, and the data mixing is performed in step S1003.

If it is determined in step S1009 that the request for quality evaluation has not been received, the processing proceeds to step S1010 and the initial value is set at a fixed value. Processing then returns to step S1002.

As described above, after the output of the random-number data to outside the random-number generating apparatus starts, the fixed value is written in the data holding unit so that the quality of data extracted from the data holding unit is intentionally reduced. Since the quality evaluation unit performs the quality evaluation in response to a request for quality evaluation, the data segment can be mixed while an external application does not require random numbers. Therefore, system performance is not affected by overhead in data mixing and quality evaluation, and the random-number data that is of high quality and high tamper resistance can be output all the time.

In the exemplary embodiments, as the quality evaluation performed by the quality evaluation unit 5, tests 1 to 4 are employed in order to conform to the standards of FIPS PUB 140-2. However, the present invention is not limited to this evaluation. For example, only test 3 may be employed. Alternatively, any test may be selected and set freely.

The present invention can also be achieved by supplying a storage medium (or a recoding medium) storing software program code that achieves the functions of the above-described embodiments to a system or an apparatus and by causing a computer (central processing unit (CPU) or microprocessing unit (MPU)) of the system or apparatus to read and execute the software program code.

In such a case, the program code itself read out of the storage medium realizes the functions of the above-described embodiments. Therefore, the storage medium storing the program code can also realize the present invention. The functions of the above-described embodiments can be realized by another method in addition to executing the program code read out by the computer. For example, the functions of the above-described embodiments can be realized by a process in which an operating system (OS) running on the computer executes some of or all of the functions in the above-described embodiments under the control of the program code.

The present invention can also be achieved by writing the program code read out of the storage medium to a memory of an add-on expansion board of a computer or a memory of an add-on expansion unit connected to a computer. The functions of the above-described embodiments can be realized by a process in which, after the program code is written, a CPU in the add-on expansion board or in the add-on expansion unit executes some of or all of the functions in the above-described embodiments under the control of the program code.

The present invention can also be achieved by distributing program code that achieves the function of the above-described embodiment via a network and storing the program code in a storage device such as a hard disk and a memory of a system or an apparatus or a recording medium including a CD-RW (CD-rewritable) and a CD-R (CD recordable) and by a computer (CPU or MPU) of the system or the apparatus reading out the program code stored in the storage device or the recording medium and executing the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-189942 filed Jun. 29, 2005, which is hereby incorporated by reference herein in its entirety.

What is claimed is:

1. An apparatus for generating a random number, the apparatus comprising:
   a holding unit configured to hold a data segment;
   a quality evaluation unit configured to perform a quality evaluation of the data segment held in the holding unit as a random number;
   a mixing unit configured to mix the evaluated data segment based on a result of the quality evaluation performed by the quality evaluation unit; and
   an output control unit configured to control an output of the evaluated data segment based on a result of the quality evaluation performed by the quality evaluation unit.

2. The apparatus according to claim 1, wherein the output control unit is configured to output the data segment held in the holding unit in a case where the quality evaluation unit determines that the quality of the data segment held in the holding unit is acceptable as a random number, and in a case where the result of the quality evaluation is not acceptable, not output any of the data segment.

3. The apparatus according to claim 2, wherein the mixing unit is configured to mix the data segment held in the holding unit a mixing number m of at least one time in the case where the quality evaluation unit determines that the quality of the data segment held in the holding unit is not acceptable as a random number.

4. The apparatus according to claim 3, wherein the quality evaluation unit is configured to perform the quality evaluation with respect to only a test in which a previous quality evaluation of the data segment is not acceptable in a case where a plurality of tests in a random number test are performed by the quality evaluation unit, after a further mix is performed.

5. The apparatus according to claim 3, wherein the mixing number m is determined based on statistics of numbers of mixes of a plurality of sample data segments, the statistics being obtained by mixing the plurality of sample data segments and by performing the quality evaluation on each of the sample data segments, the numbers of mixes allowing the sample data segments to pass the respective quality evaluations.

6. The apparatus according to claim 3, wherein the mixing number m is determined based on a result of the quality evaluation of a data segment that is different from a data segment targeted for mixing.

7. The apparatus according to claim 1, wherein, a fixed value is written in at least one part of the holding unit in a case where the output control unit starts the output of the data segment.

8. The apparatus according to claim 7, wherein the fixed value is written in the at least one part of the holding unit until the quality evaluation unit receives a quality-evaluation request from outside the apparatus.

9. The apparatus according to claim 1, wherein the quality evaluation unit is configured to perform the quality evaluation of the data segment after the mixing unit mixes the data segment n times, where n is at least one.

10. The apparatus according to claim 9, wherein the apparatus is configured to hold a predicted value of the mixing number required for passing the quality evaluation performed by the quality evaluation unit.

11. The apparatus according to claim 10, wherein the predicted value of the mixing number is determined by calculating the mixing number required for passing the quality evaluation based on probability.

12. The apparatus according to claim 9, wherein the output control unit is configured to, in a case where the result of the quality evaluation performed by the quality evaluation unit is acceptable, output the data segment and, in a case where the result of the evaluation is not acceptable, not output any of the data segment.

13. The apparatus according to claim 12, wherein the mixing unit is configured to, in the case where the result of the evaluation is not acceptable, remix the data segment held in the holding unit m times, where m is at least one.

14. The apparatus according to claim 13, wherein the quality evaluation unit is configured to, in a case where a plurality of tests in a random number test performed by the quality evaluation unit is present, after a further mix is performed, perform the quality evaluation with respect to only a test in which a previous quality evaluation of the data segment is not acceptable.

15. The apparatus according to claim 13, wherein the quality evaluation unit is configured to hold a result of a quality evaluation after a k-th mix is performed and a result of a quality evaluation after a p-th mix is performed, where k<p<n, and to determine the mixing number m based on the held results.

16. The apparatus according to claim 13, wherein the mixing number m is determined based on statistics of the numbers of mixes of a plurality of sample data segments, the statistics being obtained by mixing the plurality of sample data segments and by performing the quality evaluation on each of the sample data segments, the numbers of mixes allowing the sample data segments to pass the respective quality evaluations.

17. The apparatus according to claim 13, wherein the mixing number m is determined based on a result of the quality evaluation of a data segment that is different from a data segment targeted for mixing.

18. The apparatus according to claim 1, wherein the quality evaluation unit is configured to perform a plurality of tests for evaluating the quality of random numbers.

19. The apparatus according to claim 1, wherein the output control unit is configured to output the data segment to outside the apparatus in response to a data request sent from outside the apparatus.

20. The apparatus according to claim 1, wherein the quality evaluation unit is configured to perform the quality evaluation in response to a quality-evaluation request sent from outside the apparatus.

21. The apparatus according to claim 1, wherein the output control unit is configured to extract a plurality of partial data elements from the holding unit in accordance with a predetermined rule and to combine the plurality of extracted partial data elements.

22. The apparatus according to claim 1, wherein the apparatus is an integral-type device that is nonremovable.

* * * * *